(12) United States Patent
Sivasubramanian et al.

(10) Patent No.: US 9,212,618 B2
(45) Date of Patent: Dec. 15, 2015

(54) INJECTION TIMING MANAGEMENT IN DUAL FUEL ENGINE SYSTEM

(71) Applicant: Caterpillar Inc., Peoria, IL (US)

(72) Inventors: Arvind Sivasubramanian, Peoria, IL (US); David J. Lin, Peoria, IL (US); Keith A. Intveld, Lafayette, IL (US); Jeffrey A. Howard, West Lafayette, IN (US); Christopher F. Gallmeyer, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 227 days.

(21) Appl. No.: 13/854,293

(22) Filed: Apr. 1, 2013

(65) Prior Publication Data

US 2014/0290623 A1    Oct. 2, 2014

(51) Int. Cl.
*F02D 41/40* (2006.01)
*F02D 19/06* (2006.01)
*F02D 41/30* (2006.01)
*F02D 41/00* (2006.01)

(52) U.S. Cl.
CPC .......... *F02D 41/401* (2013.01); *F02D 19/0613* (2013.01); *F02D 19/0615* (2013.01); *F02D 41/0025* (2013.01); *F02D 41/3064* (2013.01); F02D 2200/604 (2013.01); Y02T 10/36 (2013.01); Y02T 10/44 (2013.01)

(58) Field of Classification Search
CPC ............ F02D 41/0025; F02D 41/3064; F02D 41/401; F02D 19/06; F02D 19/0607; F02D 19/061; F02D 19/0613; F02D 19/0615

USPC ..................... 123/27 GE, 525, 575, 436, 431; 701/105, 110; 73/114.42, 114.48
See application file for complete search history.

(56) References Cited

U.S. PATENT DOCUMENTS

| | | | | |
|---|---|---|---|---|
| 4,411,234 A | * | 10/1983 | Middleton | ..................... 123/485 |
| 6,101,986 A | * | 8/2000 | Brown et al. | ............. 123/27 GE |
| 6,289,871 B1 | * | 9/2001 | Brown et al. | ................. 123/299 |
| 6,907,870 B2 | | 6/2005 | zur Loye et al. | |
| 7,270,089 B2 | * | 9/2007 | Wong | ......................... 123/27 GE |
| 7,913,673 B2 | * | 3/2011 | Vanderslice et al. | .......... 123/525 |
| 2005/0229903 A1 | * | 10/2005 | Kobayashi et al. | ........... 123/435 |
| 2008/0092834 A1 | * | 4/2008 | Stein et al. | .................... 123/90.15 |
| 2009/0070002 A1 | * | 3/2009 | Ishikawa | ....................... 701/103 |
| 2012/0136556 A1 | | 5/2012 | Magnusson | |

FOREIGN PATENT DOCUMENTS

WO        2012000028        1/2012

* cited by examiner

*Primary Examiner* — Stephen K Cronin
*Assistant Examiner* — Kevin R Steckbauer
(74) *Attorney, Agent, or Firm* — Miller, Matthias & Hull LLP

(57) ABSTRACT

A fuel injection timing management system for a dual fuel engine is configured to determine a first diesel injection timing corresponding to a first mode of operation of the engine system and a second diesel injection timing corresponding to a second mode of operation. The system may further determine a direction of change in a mode of operation of the engine system, and selectively perform a change in the diesel injection timing from the first diesel injection timing to the second diesel injection timing at a first rate of transition or a second rate of transition, based on the direction of change in a mode of operation of the engine system.

8 Claims, 3 Drawing Sheets

INJECTION TIMING MANAGEMENT IN DUAL FUEL ENGINE SYSTEM

TECHNICAL FIELD

The present disclosure relates generally to a dual fuel engine and, more particularly, to a fuel injection timing management system for the dual fuel engine.

BACKGROUND

Dual fuel engines are known for various applications, such as generator sets, engine-driven compressors, engine driven pumps, machine, off-highway trucks and others. Typically, such engines are stationary and operate in the field. The operation of such engines by substitution of a certain amount of heavy fuel, such as diesel, with a lighter fuel, such as natural gas, biogas, liquid petroleum gas (LPG) or other types of fuel that may be more readily available and cost effective, makes them more effective to operate.

PCT Application No. 2012000028 discloses a method of controlling fuel injection timing for an internal combustion engine. The internal combustion engine is operable with a first fuel, a second fuel or a mixture of these. The method includes intercepting angular position timing signals, before the signals are received by an electronic control unit to effect fuel injection events for the first fuel and the second fuel. The method further includes modifying the angular position timing signals, if fuel supplied to the engine includes an amount of the second fuel, and utilizing the modified angular position timing signals to determine revised injection timings for the fuel supplied to the engine, for example as a blend or mixture of the first fuel and the second fuel. However, there is still room for improvement in the art.

SUMMARY

In an aspect of the present disclosure, a controller to manage diesel fuel injection timing in a dual fuel engine system is disclosed. The controller is configured to determine a first diesel injection timing corresponding to a first mode of operation. Further, the controller is configured to detect a change in a mode of operation of the engine system to a second mode of operation of the engine system and determine a second diesel injection timing corresponding to the second mode of operation along with a direction of change in a mode of operation of the engine system. The controller is configured to selectively perform a change in the diesel injection timing from the first diesel injection timing to the second diesel injection timing at a first rate of transition or a second rate of transition, based on the direction of change in a mode of operation of the engine system.

In another aspect of the present disclosure, a method for managing the transition in desired diesel fuel injection timing from one mode of operation to another of the dual fuel engine system is disclosed. The method includes determining the direction of change in the mode of operation of the engine system from the first mode of operation to the second mode of operation, along with the diesel fuel injection timing corresponding to the first mode of operation to the second mode of operation. Further, the method includes performing the change in the diesel injection timing from the first diesel injection timing to the second diesel injection timing at the first rate of transition or the second rate of transition, based on the direction of change in the mode of operation of the engine system.

Other features and aspects of this disclosure will be apparent from the following description and the accompanying drawings.

DETAILED DESCRIPTION

Figure 1:
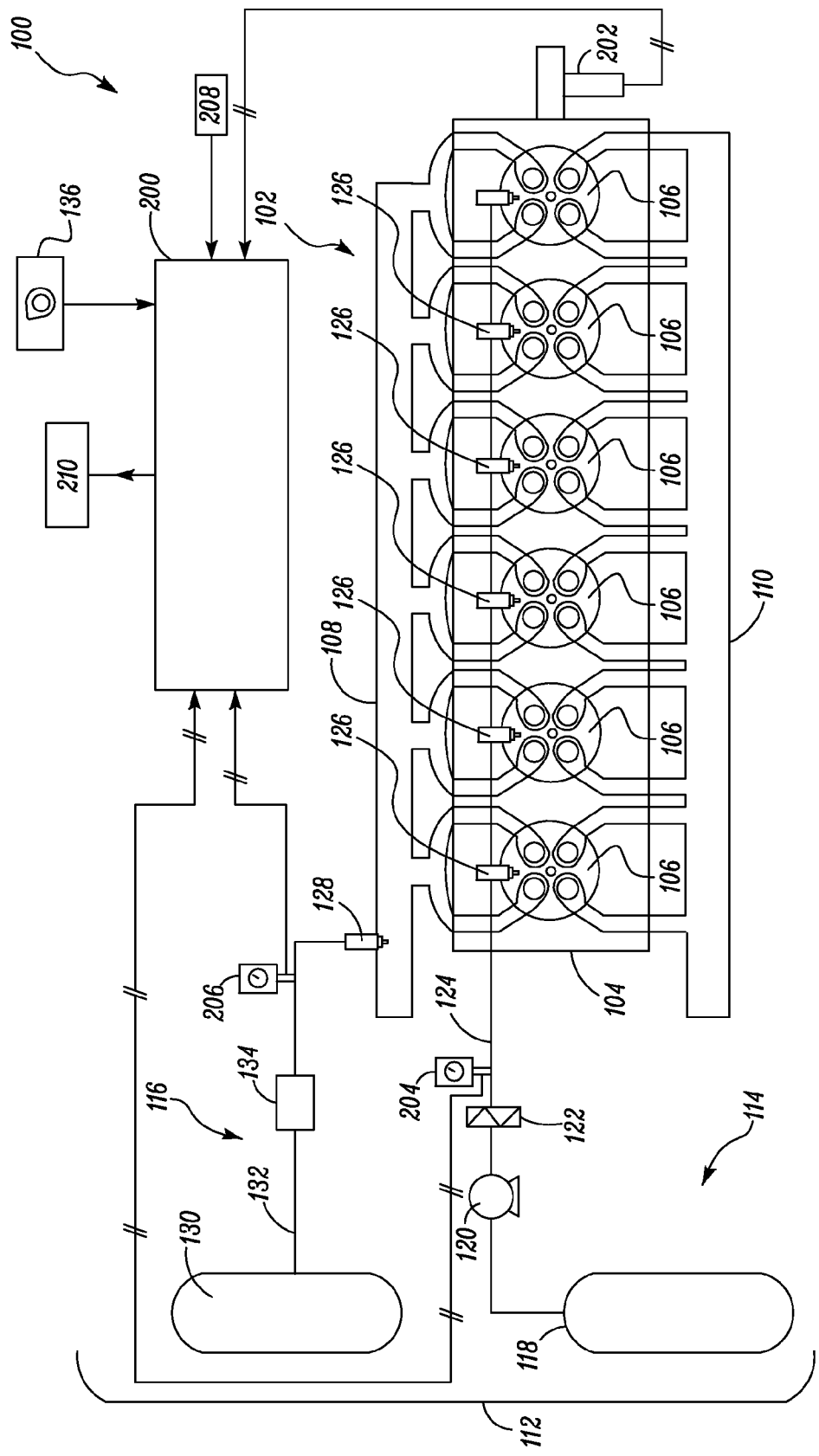
FIG. 1 is a schematic illustration of an engine system, according to an exemplary embodiment.

FIG. 1 illustrates a schematic view of an engine system 100, in which various embodiments of the present disclosure may be implemented. The engine system 100 includes an engine 102, such as a reciprocating internal combustion engine. The engine 102 may include a crankcase 104 having one or more cylinders 106 disposed therein. Although, the cylinders 106 are shown in an in-line configuration, any other number of cylinders arranged in different configurations, such as a "V" configuration, may be used. Each of the cylinders 106 includes a reciprocable piston defining a combustion chamber that is connectable to an intake manifold 108 and an exhaust manifold 110 by a suitable arrangement of intake and exhaust valves. The engine system 100 may further include various other components and systems, such as cooling system, an air-supply system, and a fuel supply system.

In an aspect of the present disclosure, the engine system 100 may be a dual-fuel engine system and include a dual-fuel supply system 112. The dual-fuel supply system 112 includes a first fuel supply system 114 and a second fuel supply system 116. The first fuel supply system 114 may supply a diesel fuel to the engine 102, and includes a first fuel reservoir 118, a pump 120, a filter 122, and a diesel fuel supply line 124, which provides the diesel fuel to diesel injectors 126. The diesel injectors 126 may be a direct-injection diesel injector associated with each of the cylinders 106. Each of the diesel injectors 126 is configured to inject a pre-determined amount of the diesel fuel into each of the cylinders 106 based on a diesel injection timing.

The second fuel supply system 116 may supply a gaseous fuel to the engine 102, and includes a gaseous fuel pressure control device, such as a gaseous fuel flow control valve 134 to supply a controlled quantity of the gaseous fuel supplied from a second fuel reservoir 130 to the intake manifold 108 via a gaseous fuel supply line 132 provided with a gas intake valve 128. The gas intake valve 128 may deliver a predetermined amount of gaseous fuel into the intake manifold 108. It will apparent to a person having ordinary skill in the art that the gaseous fuel is mixed with air to form a fuel-air mixture that is further admitted into the cylinders 106 for combustion.

The engine system 100 may operate in a diesel only mode on the diesel fuel only with no amount of the gaseous fuel, or may operate in a diesel-gas mode, such as a blended operation using both the diesel fuel and the gaseous fuel. During the diesel-gas mode of engine operation, compression ignition of a pilot diesel fuel is used to ignite the gaseous fuel-air mixture in the cylinder 106. Further, the engine operation during the diesel-gas mode is expressed in terms of a gas substitution ratio. The gas substitution ratio is a measure of percentage of diesel fuel offset by the gaseous fuel and is a function of the mass flow rates of the gaseous fuel and the diesel fuel.

The engine system 100 may further include a controller 200 to manage diesel injection timing the engine system 100. In an aspect of the present disclosure, the controller 200 may be a part of a larger control scheme for controlling and monitoring the operation of the engine system 100. The controller 200 may be further integrated with and be operating within an Engine Control Module (ECM) associated with the engine system 100. The controller 200 may be a fuel injection timing management system adapted to provide an allowable gas substitution ratio and output a diesel injection timing signal 210 based on various inputs. Normally, the diesel injection timing signal 210 is indicative of a representative angular position (in degrees) of the crankshaft and/or camshaft relative to a top dead center (TDC) of the cylinder 106. The controller 200 may receive inputs from various sensors, such as one or more crankshaft and/or camshaft angular position sensors 202, a diesel fuel mass flow rate sensor 204, and a gaseous fuel mass flow rate sensor 206. Moreover, the controller 200 may receive an engine operation input 208 indicative of an operating condition of the engine system 100, such as engine speed, engine load and other parameters. Further, the controller 200 is operatively connected to an operator mode selector switch 136. The operator mode selector switch 136 is configured to select the diesel only mode or the diesel-gas mode of operation of the engine system 100. In an embodiment, the operator mode selector switch 136 may embody a gas shutoff valve command input device to change a mode of operation of the engine system 102 from the diesel-gas mode to the diesel only mode and vice versa.

Figure 2:
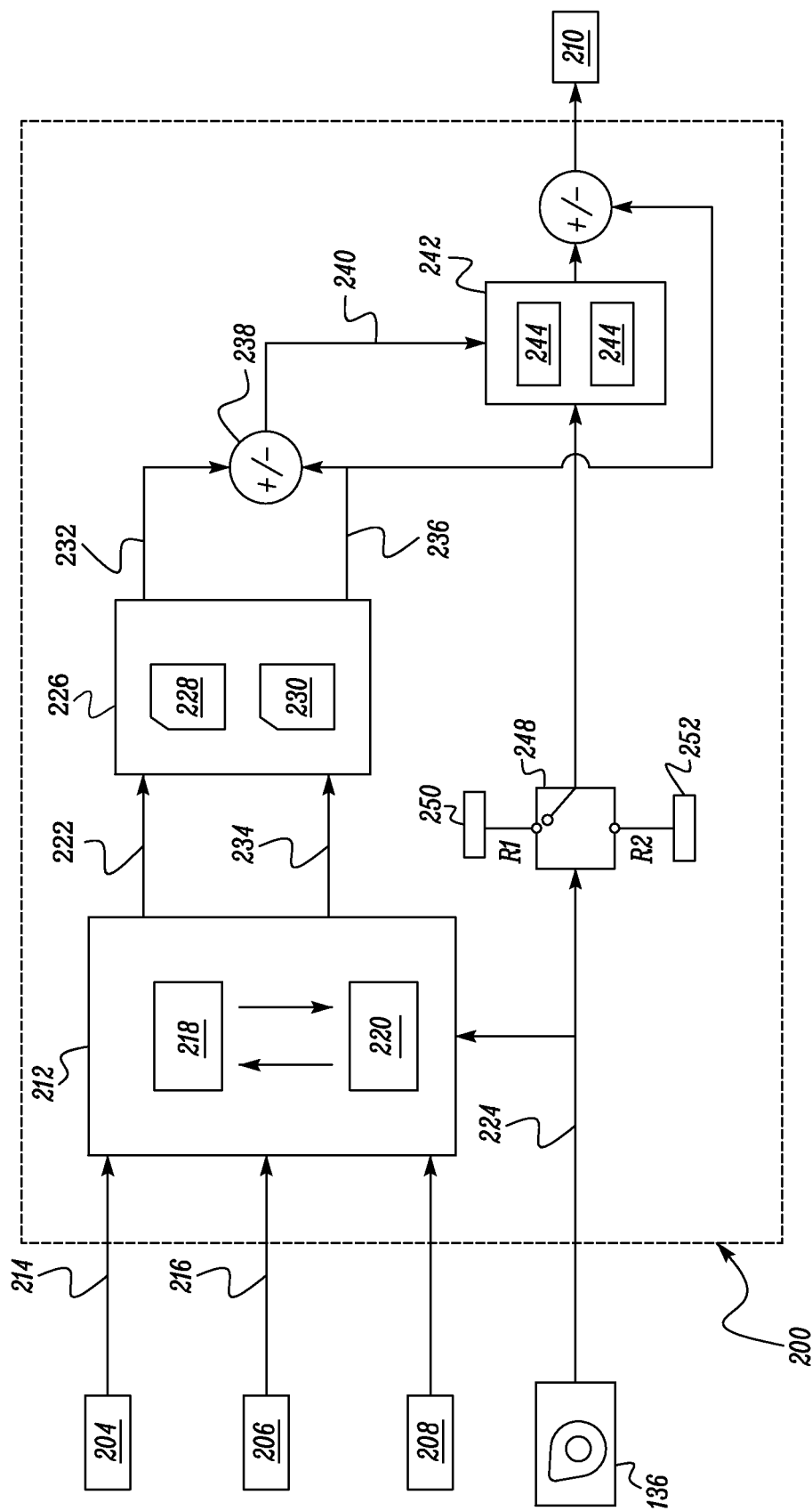
FIG. 2 is a block diagram of a controller for the engine system, according to an aspect of the present disclosure.

An exemplary block diagram of the controller 200 is illustrated in FIG. 2. The controller 200 may include a fuel supply management module 212. The fuel supply management module 212 may be configured to receive and process a diesel mass flow rate signal 214 and a gaseous fuel mass flow rate signal 216 to determine a current mode of operation of the engine system 100 (hereinafter referred as a first mode of operation of the engine system 100), which may be the diesel only mode 218, or the diesel-gas mode 220. The diesel mass flow rate signal 214 is indicative of a real time mass flow rate of the diesel fuel, and may be provided by the diesel mass flow rate sensor 204. Similarly, the gaseous fuel mass flow rate signal 216 is indicative of a real time mass flow rate of the gaseous fuel and may be provided by the gaseous fuel mass flow rate sensor 206. Further, the fuel supply management module 212 is configured to determine a first gas substitution ratio 222 corresponding to the first mode of operation of the engine system 100.

The fuel supply management module 212 is also configured to receive an input 224 from the operator mode selector switch 136. The input 224 may be indicative of an operator selected mode of operation of the engine system 100 (hereinafter referred as a second mode of operation of the engine system 100). In an exemplary embodiment, the second mode of operation of the engine system 100 may be the diesel-gas mode 220 or the diesel only mode 218, which is different from the first mode of operation of the engine system 100. In an embodiment, the fuel supply management module 212 may also use the engine operation input 208, the diesel mass flow rate signal 214, and the gaseous fuel mass flow rate signal 216 along with the input 224 from the operator mode selection switch 136 to detect a change in a mode of operation of the engine system 100 from the first mode of operation to the second mode of operation of the engine system 100.

The controller 200 may further include a fuel injection timing function 226. The fuel injection timing function 226 may include lookup tables or lookup functions, such as diesel only injection timing maps 228, and a diesel-gas injection timing map 230. The fuel injection timing function 226 is configured to receive the first gas substitution ratio 222 and output a signal indicative of a first diesel injection timing 232 corresponding to the first mode of operation of the engine system 100. Further, upon receiving the input 224, the fuel supply management module 212 is configured to determine a second gas substitution ratio 234 corresponding to the second mode of operation of the engine system 100. Further, the fuel injection timing function 226 is configured to receive the second gas substitution ratio 234 and output a signal indicative of a second diesel injection timing 236 corresponding to the second mode of operation of the engine system 100.

The first diesel injection timing 232 and the second diesel injection timing 236 may be supplied to an adder/subtractor circuit 238 to determine a change in the diesel injection timing 240 due to the change in the mode of operation of the engine system 100. In an embodiment, a low-pass filter circuit system 242 is applied to the change in the diesel injection timing 240. The low-pass filter circuit system 242 may include one or more low-pass filter circuits 244 to modify the change in the diesel injection timing 240 into the diesel injection timing signal 210. In an exemplary embodiment, the low-pass filter circuits 244 may include a clamping circuit based on amplifiers to add, subtract or multiply pre-defined frequencies to modify the change in the diesel injection timing 240 into the diesel injection timing signal 210.

According to an embodiment of the present disclosure, the operator mode selector switch 136 may be operatively connected to a switch 248. The switch 248 is adapted to selectively tune the low-pass filter circuit system 242 to perform the change in the diesel injection timing 240 from the first diesel injection timing to the second diesel injection timing, at a first rate of transition R1 or a second rate of transition R2. In an embodiment, the switch 248 is configured to determine a direction of change in the mode of operation of the engine system 100 and accordingly select a diesel-to-gas tuning 250 or a gas-to-diesel tuning 252 based on the direction of change in the mode of operation of the engine system 100. In an embodiment, the diesel-to-gas tuning 250 and the gas-to-diesel tuning 252 may represent different time constants for the low-pass filter circuits 244 indicative of the first rate of transition R1 and the second rate of transition R2. In an embodiment, the first rate of transition R1 is larger than the second rate of transition R2. Accordingly, the low-pass filter circuit system 242 achieves a faster or slower closure from the first diesel injection timing 232 to the second diesel injection timing 236 based on the direction of change in the mode of operation of the engine system 100.

In an exemplary embodiment, when the first mode of operation is indicative of the diesel only mode 218 and the second mode of operation is indicative of the diesel-gas mode 220, the low pass filter circuit 244 is selectively tuned, based on the diesel-to-gas tuning 250, to perform the faster change in diesel injection timing from the first diesel injection timing to the second diesel injection timing at the first rate of transition R1. Alternatively, when the first mode of operation is indicative of the diesel-gas mode 220 and the second mode of operation is indicative of the diesel only mode 218, the low pass filter circuit 244 is selectively tuned, based on the gas-to-diesel tuning 252, to perform the slower change in diesel injection timing from the first diesel injection timing to the second diesel injection timing at the second rate of transition R2.

The controller 200 associated with the engine system 100 may be embodied as a micro-processor and is adapted to monitor various other operating parameters and to responsively regulate various variables and functions affecting operations of the engine system 100. The controller 200 may include a microprocessor, an application specific integrated circuit (ASIC), or other appropriate circuitry, and may have memory or other data storage capabilities. The controller 200 may perform operations, include functions, steps, routines, data tables, data maps, charts, and the like, saved in, and executable from, read only memory, or another electronically accessible storage medium, to control the engine system 100.

INDUSTRIAL APPLICABILITY

Dual-fuel engine systems are known for various applications, such as generator sets, engine-driven compressors, engine driven pumps, machine, off-highway trucks and others. Operating these engines in the diesel-gas mode by substitution of a diesel fuel, with a gaseous fuel, such as natural gas, biogas, liquid petroleum gas (LPG), methane, propane, or any gaseous hydrocarbon fuel, makes them more effective to operate.

During the diesel-gas mode of operation, the fuel-air mixture, present in the intake manifold 108, is admitted into each cylinder 106. Further, diesel fuel is injected into each cylinder 106 at the appropriate time and duration during engine operation to provide a rich fuel-air mixture. Compression of the rich fuel-air mixture within the cylinder 106 causes auto-ignition of the diesel fuel, which initiates combustion of the gaseous fuel in the cylinder.

Any change in the mode of operation of the engine system 100 may require various changes, such as diesel fuel injection amounts, diesel injection timing, and the like, so that efficiency and proper operation of the engine system 100 are maintained. Further, in the engine system 100, the change in the mode of operation such as from the diesel only mode 218 to a diesel-gas mode 220, and vice-versa, may cause a change in engine parameters such as engine speed, torque, cylinder pressure, exhaust temperature, detonation level, various emissions levels, etc. These changes may require mode-specific management of the diesel injection timing, and in particular, managing the change in the diesel injection timing specific to the direction of change in the mode of operation of the engine system 100, in order to operate the engine safely and meet engine performance requirements. In an aspect of the present disclosure, the controller 200 manages a rate of transition for change in the diesel injection timing between different modes of operation of the engine system 100, based on the direction of that change in the mode of operation of the engine system 100, such that the controller 200 or other associated control means may effectively control the overall engine system 100.

Figure 3:
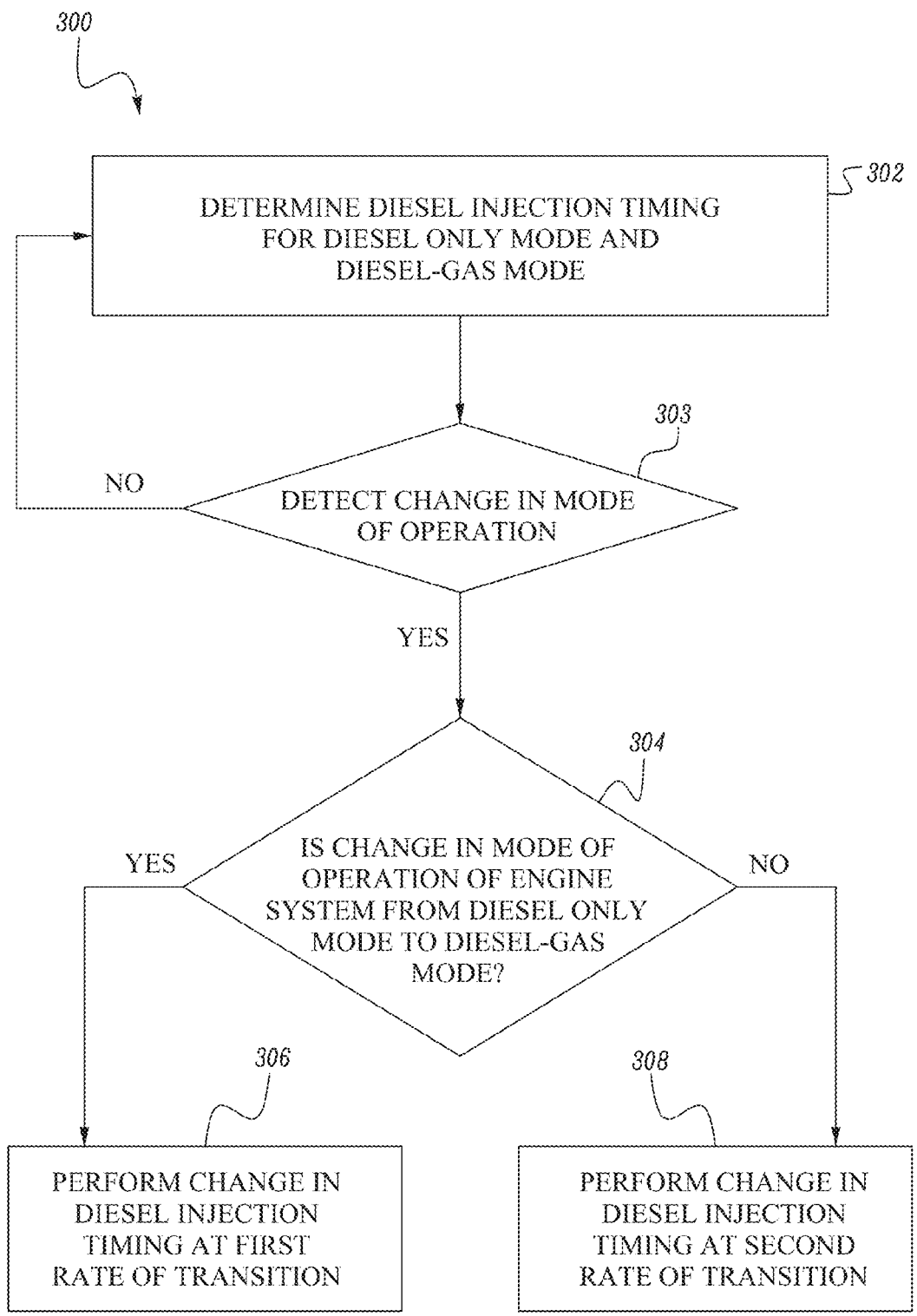
FIG. 3 illustrates a method flow chart for controlling diesel fuel injection timing in the engine system, according to an aspect of the present disclosure.

FIG. 3 illustrates an exemplary flow chart for a method 300 for controlling and managing a transition in the diesel injection timing in the engine system 100, according to an aspect of the present disclosure. At step 302 of the method 300, the fuel injection timing function 226 may determine the first diesel injection timing 232 and the second diesel injection timing 236 corresponding respectively to the diesel-only mode 218 and the diesel-gas mode 220 of operation of the engine system 100. As described above, the fuel injection timing function 226 may determine the first and the second diesel injection timings 232, 236 using the injection timing maps 228, 230. At step 303, the switch 248 may detect a change in the mode of operation of the engine system 100 and at step 304, the switch 248 may determine a direction of change in the mode of operation of the engine system 100 based on the input 224 from the operator mode selector switch 136, such as from diesel only mode to the diesel-gas and vice-versa.

Further, in case the mode of the operation of the engine system 100 changes from the diesel only mode to the diesel-gas mode (Step 304: YES), at step 306 of the method 300, the switch 248 selects a diesel-to-gas tuning 250 to tune the low-pass filter system 242 for the faster change in diesel injection timing 240 at the first rate of transition R1. Alternatively, in case the mode of the operation of the engine system 100 changes from the diesel-gas mode to the diesel only mode (Step 304: NO), at step 308 of the method 300, the switch 248 selects a gas-to-diesel tuning 252 to tune the low-pass filter system 242 for the slower change in diesel injection timing 240 at the second rate of transition R2.

Although the embodiments of this disclosure as described herein may be incorporated without departing from the scope of the following claims, it will be apparent to a person skilled in the art that various modifications and variations to the above disclosure may be made. Other embodiments will be apparent to those skilled in the art from consideration of the specification and practice of the disclosure. It is intended that the specification and examples be considered as exemplary only, with a true scope being indicated by the following claims and their equivalents.

What is claimed is:

1. A diesel fuel injection timing management system for a dual fuel engine system having a diesel-gas mode and a diesel only mode, the system comprising:
    a diesel fuel mass flow rate sensor configured to generate a diesel fuel mass flow rate signal indicative of a diesel fuel mass flow rate;
    a gaseous fuel mass flow rate sensor configured to generate a gaseous fuel mass flow rate signal indicative of a gaseous fuel mass flow rate;
    a mode selector switch configured to generate a switch signal indicative of a selected mode of operation of the engine system; and
    a controller operably coupled to the diesel mass flow rate sensor, gaseous fuel mass flow rate sensor, and mode selector switch, the controller being programmed to:
    determine a diesel injection timing for the diesel-gas mode;
    determine a diesel only injection timing for the diesel only mode;
    determine a change in the diesel injection timing based on a difference between the diesel injection timing and the diesel only injection timing;
    determine whether a first mode of operation of the engine system is the diesel-gas mode or the diesel only mode based on the diesel fuel mass flow rate signal and the gaseous fuel mass flow rate signal;
    detect a change in a mode of operation of the engine system from the first mode of operation to a second mode of operation based on the switch signal;
    determine a direction of change of mode of operation of the engine system between the diesel only mode and the diesel-gas mode;
    when the direction of change of mode of operation of the engine system is from the diesel only mode to the diesel-gas mode, command the change in the diesel injection timing at a first transition rate; and
    when the direction of change of mode of operation of the engine system is from the diesel-gas mode to the diesel only mode, command the change in the diesel injection timing at a second transition rate different from the first transition rate.

2. The system of claim 1, wherein the first transition rate is larger than the second transition rate.

3. The system of claim 1, in which the controller further comprises a low-pass filter circuit configured to generate the first rate of transition and the second rate of transition.

4. A method for controlling diesel fuel injection timing in a dual fuel engine system operable in a diesel-gas mode and a diesel only mode, the method comprising:
   determining a diesel injection timing for the diesel-gas mode;
   determining a diesel only injection timing for the diesel only mode;
   determining a change in the diesel injection timing based on a difference between the diesel injection timing and the diesel only injection timing;
   determining whether a first mode of operation of the engine system is the diesel-gas mode or the diesel only mode based on a diesel fuel mass flow rate signal from a diesel fuel mass flow rate sensor and a gaseous fuel mass flow rate signal from a gaseous fuel mass flow rate sensor;
   detecting a change in a mode of operation of the engine system from the first mode of operation to a second mode based on a switch signal from a mode selector switch;
   determining a direction of change of mode of operation of the engine system between the diesel only mode and the diesel-gas mode;
   when the direction of change of mode of operation of the engine system is from the diesel only mode to the diesel-gas mode, commanding the change in the diesel injection timing at a first transition rate; and
   when the direction of change of mode of operation of the engine system is from the diesel-gas mode to the diesel only mode, command the change in the diesel injection timing at a second transition rate different from the first transition rate.

5. The method of claim 4, wherein the first transition rate is larger than the second transition rate.

6. The method of claim 4, wherein a low-pass filter circuit is configured to generate the first rate of transition and the second rate of transition.

7. A dual-fuel engine system having a diesel-gas mode and a diesel only mode, the system comprising:
   a first fuel supply system configured to supply a diesel fuel;
   a second fuel supply system configured to supply a gaseous fuel; and
   a diesel fuel injection timing management system including:
      a diesel fuel mass flow rate sensor configured to generate a diesel fuel mass flow rate signal indicative of a diesel fuel mass flow rate;
      a gaseous fuel mass flow rate sensor configured to generate a gaseous fuel mass flow rate signal indicative of a gaseous fuel mass flow rate;
      a mode selector switch configured to generate a switch signal indicative of a selected mode of operation of the engine system;
      a controller operably coupled to the diesel mass flow rate sensor, gaseous fuel mass flow rate sensor, and mode selector switch, the controller being programmed to:
         determine a diesel injection timing for the diesel-gas mode;
         determine a diesel only injection timing for the diesel only mode;
         determine a change in the diesel injection timing based on a difference between the diesel injection timing and the diesel only injection timing;
         determine whether a first mode of operation of the engine system is the diesel-gas mode or the diesel only mode based on the diesel fuel mass flow rate signal and the gaseous fuel mass flow rate signal;
         detect a change in a mode of operation of the engine system from the first mode of operation to a second mode of operation based on the switch signal;
         determine a direction of change of mode of operation of the engine system between the diesel only mode and the diesel-gas mode;
         when the direction of change of mode of operation of the engine system is from the diesel only mode to the diesel-gas mode, command the change in the diesel injection timing at a first transition rate; and
         when the direction of change of mode of operation of the engine system is from the diesel-gas mode to the diesel only mode, command the change in the diesel injection timing at a second transition rate different from the first transition rate.

8. The dual-fuel engine system of claim 7, wherein the first transition rate is larger than the second transition rate.

* * * * *